No. 708,293. Patented Sept. 2, 1902.
R. L. BAKER.
COVER LIFTING DEVICE FOR PAILS, &c.
(Application filed July 20, 1901.)
(No Model.)
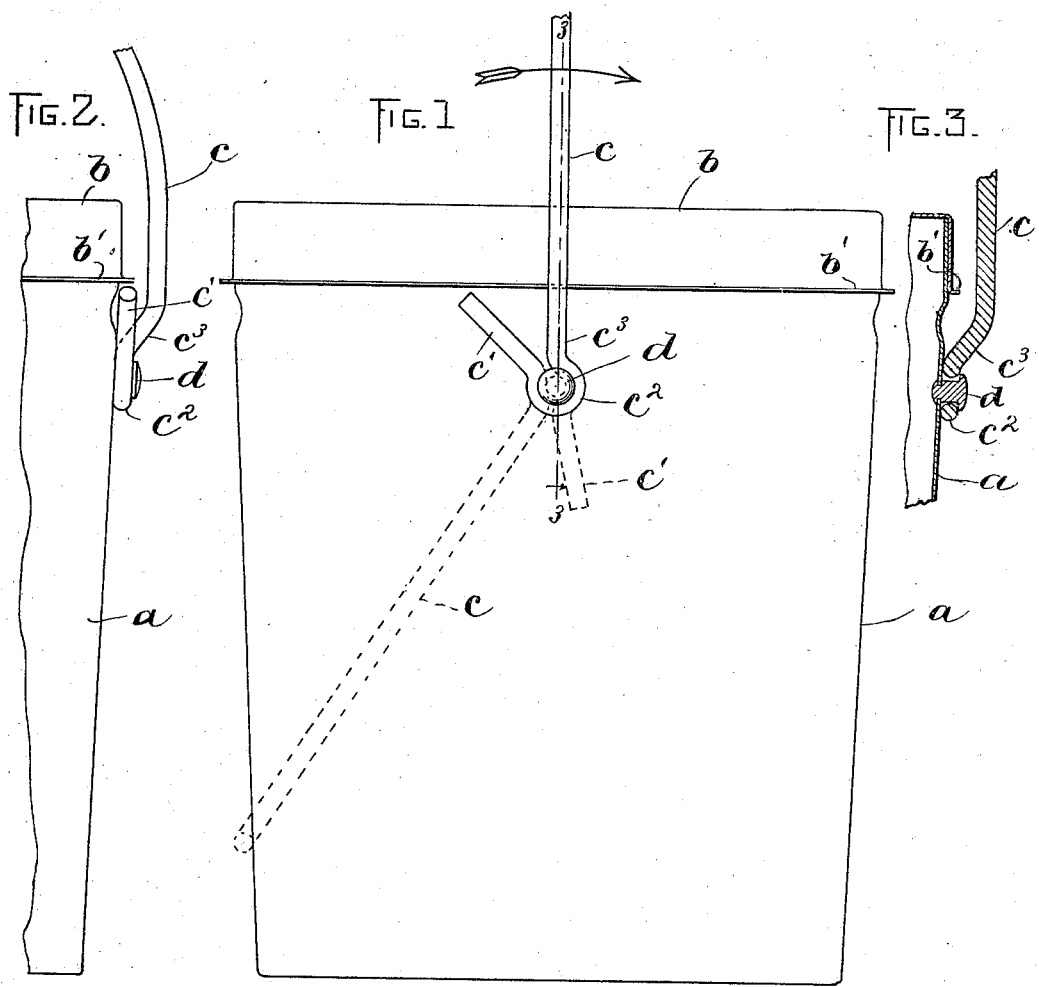
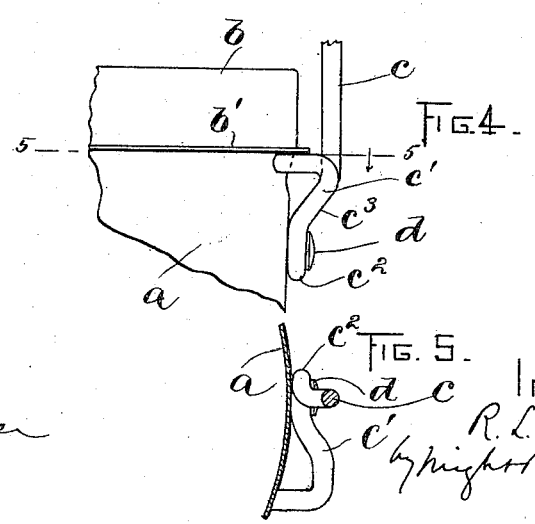
WITNESSES:
INVENTOR:
R. L. Baker

UNITED STATES PATENT OFFICE.

ROBERT L. BAKER, OF SOMERVILLE, MASSACHUSETTS.

COVER-LIFTING DEVICE FOR PAILS, &c.

SPECIFICATION forming part of Letters Patent No. 708,293, dated September 2, 1902.

Application filed July 20, 1901. Serial No. 69,025. (No model.)

*To all whom it may concern:*

Be it known that I, ROBERT L. BAKER, of Somerville, in the county of Middlesex and State of Massachusetts, have invented certain new and useful Improvements in Cover-Lifting Devices for Pails, &c., of which the following is a specification.

This invention has for its object to enable the bail of a sheet-metal pail to lift the cover of the pail from its seat when the bail is swung in one direction from a vertical position, so that the bail can be utilized to dislodge or remove the cover.

The invention consists in the improvements which I will now proceed to describe and claim.

Of the accompanying drawings, forming a part of this specification, Figure 1 represents an elevation of a pail embodying my invention, the bail being shown edgewise. Fig. 2 represents an elevation showing a side view of the bail. Fig. 3 represents a section on line 3 3 of Fig. 1. Fig. 4 represents a view similar to Fig. 2, showing a slight variation in the form of the cover-lifting parts of the bail. Fig. 5 represents a section on line 5 5 of Fig. 4.

The same reference characters indicate same parts in all the figures.

In the drawings, $a$ represents the body of a sheet-metal pail, and $b$ the cover thereof.

$c$ represents the bail, which is adapted to swing on studs $d$, affixed to the pail, and is provided with fingers $c'$, located at one side of the axis of the bail. The fingers $c'$ are so arranged that when the bail is in a vertical position, as shown by full lines in Fig. 1, the upper ends of the fingers will be in close proximity to but not in actual contact with the lower edge of the flange of the cover, the arrangement of the fingers being such that when the bail is swung in the direction of the arrow in Fig. 1 the fingers will move in a curved path which is substantially parallel with the adjacent surface of the pail and will strike the lower edge of the said flange and raise the cover from its seat. When the cover is swung in the opposite direction to the position shown in dotted lines in Fig. 1, the fingers $c'$ are moved away from the cover. It will be seen, therefore, that when the pail is in storage and its bail is in the dotted-line position the fingers have no effect on the cover. It will also be seen that when the bail is lifted from said position to a vertical position to support the pail the fingers have no effect on the cover. When, however, the bail is swung toward the opposite side of the pail or in the direction of the arrow, the fingers will immediately engage and lift the cover far enough to enable the latter to be easily removed.

The form and construction of the fingers $c'$ may be variously modified. I prefer to make the fingers as integral parts of the bail, the fingers and bail being made from a single piece of wire, bent to form eyes $c^2$, which embrace the studs $d$. The fingers $c'$ extend diagonally from said eyes relatively to the plane of the bail, as shown in Fig. 1.

I prefer to provide the flange of the cover $b$ with an outwardly-projecting lip $b'$ to form a bearing for the upper ends of the fingers $c'$. This lip may extend continuously around the flange or it may be formed only at the parts of the flange which are in the paths of the fingers.

The material of the bail is preferably bent, as shown at $c^3$, so that the eyes $c^2$ are offset from the side portions of the bail, the latter being thus caused to stand out from the sides of the pail and clear the lip $b'$.

The fingers $c'$ may be bent inwardly at their upper ends, as shown in Fig. 4, to insure a more extended contact with the lip $b'$, the fingers being formed so that the inwardly-bent ends will bear on the sides of the pail just before they begin to engage the cover, so that the fingers will be caused to spring outwardly by the curvature of the pail until they reach a vertical position and to spring inwardly by their own resilience after they have passed said vertical position.

I claim—

1. A covered pail having a pivoted bail offset above its pivoted portions to avoid contact with a cover-flange surrounding the pail and provided with cover-lifting fingers located outside the pail and at one side of the axis of the bail and arranged to be moved against the lower edge of the cover-flange in paths which are substantially parallel with the adjacent surfaces of the pail, by a swinging movement of the bail in one direction, and away from the said flange by a swinging movement of the bail in the opposite direction.

2. A covered pail having an outwardly-projecting lip on the flange of its cover, and a bail pivoted to the body of the pail and provided with cover-lifting fingers located outside the pail and at one side of the axis of the bail and arranged to move in paths which are substantially parallel with the adjacent surfaces of the pail and to strike said lip when the bail is moved in one direction from a vertical position.

3. A covered pail, a bail therefor having pivot-engaging eyes offset inwardly from the side portions of the bail, whereby said side portions are caused to stand out from and clear a lip on the cover of the pail, the said eyes being extended to form lip-engaging fingers located outside the pail and within the said side portions, and arranged to lift the cover when the bail is swung in one direction from a vertical position, said fingers moving in paths that are substantially parallel with the adjacent surfaces of the pail.

4. A covered pail having a pivoted supporting-bail provided with cover-lifting fingers located outside the pail and at one side of the axis of the bail and arranged to be moved toward the cover in paths which are substantially parallel with the adjacent surfaces of the pail by a swinging movement of the bail in one direction, and away from the cover by a swinging movement of the bail in the opposite direction, said fingers being bent inwardly at their upper ends toward the body of the pail and adapted to bear yieldingly thereon.

In testimony whereof I have affixed my signature in presence of two witnesses.

ROBERT L. BAKER.

Witnesses:
  C. F. BROWN,
  E. BATCHELDER.